(12) United States Patent
Andre et al.

(10) Patent No.: US 7,216,911 B2
(45) Date of Patent: May 15, 2007

(54) MOTOR VEHICLE REAR MODULE

(75) Inventors: Gérald Andre, Amberieu en Bugey (FR); Dominique Delavalle, Pont d'Ain (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 11/049,364

(22) Filed: Feb. 2, 2005

(65) Prior Publication Data
US 2005/0206180 A1    Sep. 22, 2005

(30) Foreign Application Priority Data
Feb. 3, 2004    (EP) .................................. 04290282

(51) Int. Cl.
*B62D 24/00*    (2006.01)
(52) U.S. Cl. .............. 296/26.08; 296/193.08; 296/203.04; 280/638; 280/781; 280/785
(58) Field of Classification Search ............ 296/26.08, 296/26.09, 193.08, 203.04; 180/208, 209, 180/311; 280/638, 656, 86.5, 781, 785, 790, 280/800, 767, 769
See application file for complete search history.

(56) References Cited

U.S. PATENT DOCUMENTS

| | | | | |
|---|---|---|---|---|
| 3,888,539 A | * | 6/1975 | Niessner | 296/156 |
| 3,966,075 A | * | 6/1976 | Schultz | 220/1.5 |
| 4,133,571 A | * | 1/1979 | Fillios | 296/165 |
| 4,848,831 A | * | 7/1989 | Buday | 296/165 |
| 5,127,697 A | * | 7/1992 | St. Marie | 296/26.09 |
| 6,199,894 B1 | | 3/2001 | Anderson | |
| 2002/0105201 A1 | * | 8/2002 | Melotik et al. | 296/26.09 |
| 2003/0137160 A1 | * | 7/2003 | Lacy | 296/26.09 |
| 2003/0141733 A1 | * | 7/2003 | Burg | 296/26.09 |
| 2003/0164622 A1 | * | 9/2003 | De Gaillard | 296/26.09 |
| 2004/0245794 A1 | * | 12/2004 | McManus et al. | 296/26.08 |

FOREIGN PATENT DOCUMENTS

| | | |
|---|---|---|
| EP | 0 661 202 A | 7/1995 |
| FR | 2 771 697 A | 6/1999 |
| GB | 2 218 384 A | 11/1989 |

\* cited by examiner

*Primary Examiner*—Lori L. Lyjak
(74) *Attorney, Agent, or Firm*—James R. Williams

(57) ABSTRACT

The module is extended to extend the body (10) of said vehicle by being fastened thereto. It is also designed to support rear doors (14) and a rear bumper. It comprises a frame of plastics material (24) including fastener means for fastening to the body and fastener means (28) to the doors (14). It further comprises extenders (26) for extending side rails (20) of the vehicle.

9 Claims, 1 Drawing Sheet

MOTOR VEHICLE REAR MODULE

The present invention relates to a motor vehicle rear module of the type for extending the body of said vehicle by being fastened thereto, and for supporting rear doors and a rear bumper.

It is known in the prior art to mount various different rear modules on a common body base in order to obtain at little cost a wide variety of vehicles having different rear shapes. One such module and the associated assembly method are described in document U.S. Pat. No. 4,968,087, for example.

That prior art presents several drawbacks. Firstly the rear module constitutes a large portion of the body and consequently represents a non-negligible fraction of the weight of the final load-carrying structure. In addition, vehicles having different rear shapes are distinguished during manufacture of the body, i.e. a long way upstream on the assembly line. This requires specific dispositions to be taken very far upstream in the vehicle assembly line, and as a consequence, having such a diversity of vehicles turns out to be expensive.

In order to mitigate those problems, the invention seeks to provide a motor vehicle rear module providing a substantial reduction in the weight of the load-carrying structure and suitable for being integrated in the vehicle at the end of vehicle assembly.

To this end, the object of the invention is to provide a motor vehicle rear module of the above-specified type, characterized in that it comprises a frame made of plastics material including means for fastening to the body, and fastener means for the doors, and in that it includes extenders for extending side rails of the vehicle.

A rear module of the invention may further comprise one or more of the following characteristics:

the frame is made of composite material;
the extenders are fastened beneath the frame;
the extenders are incorporated in the frame;
the body includes fastener means for rear doors of the vehicle; and
the fastener means for fastening the frame to the body engage the fastener means for fastening doors to the body.

The invention will be better understood on reading the following description given purely by way of example and made with reference to the accompanying drawings in which:

FIG. 1 shows the rear end of a motor vehicle body 10.

Figure 1:
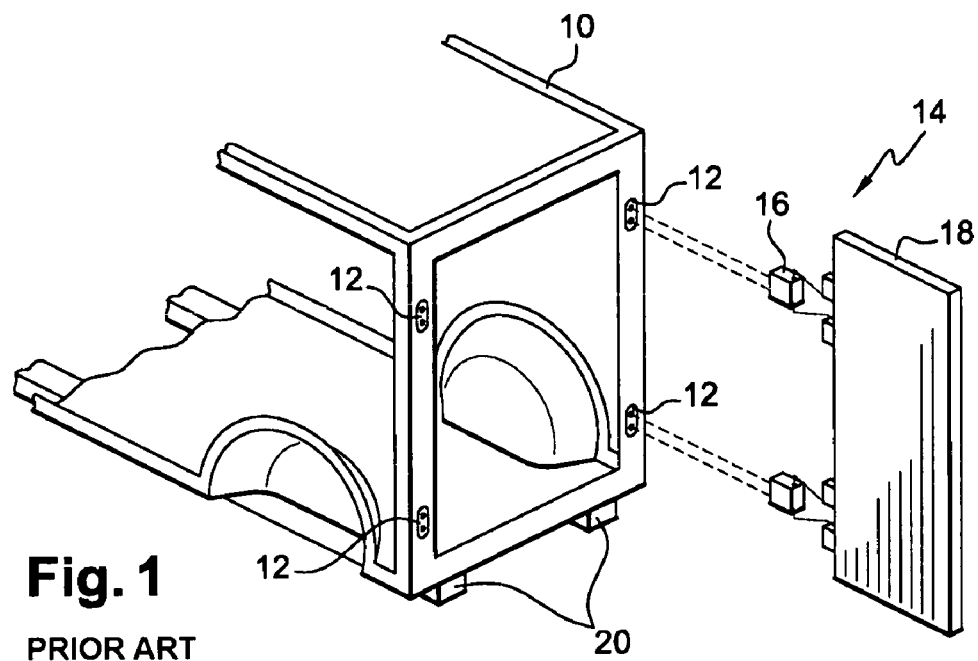
FIG. 1 shows the prior art method of mounting rear doors on a motor vehicle.

In conventional manner, the body 10 has means 12 for fastening rear doors 14 to the vehicle. For example these means may be holes in the body for receiving a bolt that is to be held by a nut.

The rear doors 14 may have a wide variety of shapes. The present description relates solely to two rear doors hinged about respective vertical axes. For reasons of clarity, only one door is shown in the figures. [The term "door" is used broadly herein to cover any kind of rear entry means including tailgates, hatches, etc.].

Thus, each rear door 14 has hinges 16 for fastening to the body 10, and a door panel 18 for associating with the hinges 16.

In order to ensure that the vehicle is sufficiently rigid, two side rails 20 are disposed in conventional manner under the body 10.

Figure 2:
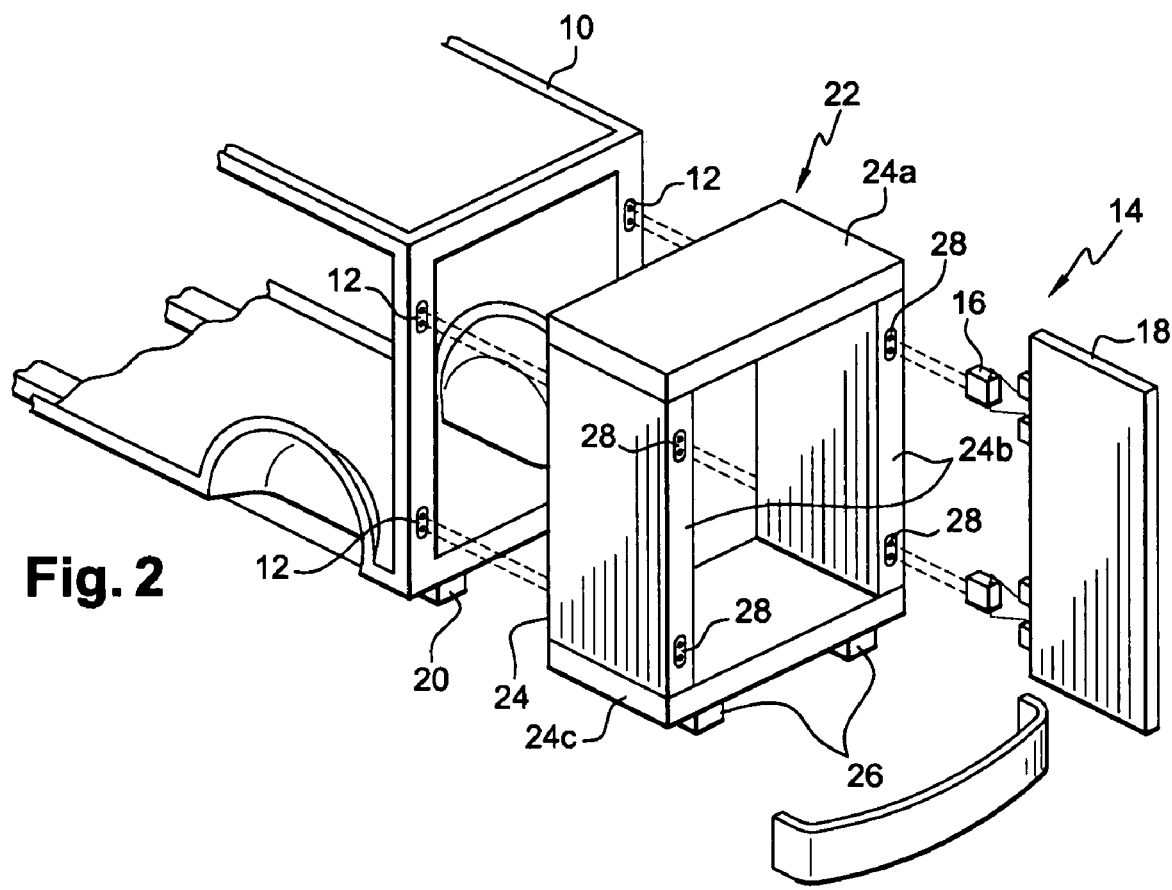
FIG. 2 shows the method of mounting a motor vehicle rear module in an embodiment of the invention.

FIG. 2 shows a rear module 22 comprising a frame of plastics material 24 and extenders 26 of the vehicle side rails.

The frame 24 is constituted by a top portion 24A, two vertical portions 24B, and a bottom portion 24C, all made of plastics material, e.g. a thermoplastic material.

The frame 24 has fastener means (not shown) co-operating with the fastener means 12 of the body in order to secure those two elements together.

The frame 24 also has fastener means 28 for fastening rear doors 14.

In the example described, said fastener means 28 are identical to the fastener means 12. In other embodiments, the rear module 22 could be designed to carry doors of types other than those originally intended for the body 10.

The extenders 26 are preferably of channel-section and made of metal.

Once in place, the module 22 extends the body 10 of the vehicle and also extends its side rails 20.

The module is also designed to carry bodywork elements (not shown) and a rear bumper (not shown) by means of fasteners which, like for the doors, are identical to those that enable the bumper to be fastened directly to the body. The extenders 26 of the kind defined in the invention enable any forces that are applied to the bumper to be transmitted to the side rails 20.

The invention is not limited to the embodiment described.

In particular, the body 10 need not be designed to receive rear doors 14 but may be designed to receive a module 22 of the invention. Under such circumstances, the body 10 and the rear module 22 have specific, complementary fastener means.

In a variant, the rear frame 24 may be made of composite material.

In another variant, the side rail extenders 26 are integrated in the bottom portion 24C of the rear frame 24.

The invention claimed is:

1. A motor vehicle rear module for extending a body of a vehicle by fastening thereto, the rear module being supported only by the body, and for supporting rear doors and a rear bumper, the motor vehicle rear module comprising a frame comprising:
   a) a plastic material;
   b) means for fastening to the body;
   c) fasteners for the rear doors; and
   d) extenders for extending side rails of the vehicle.

2. The motor vehicle rear module of claim 1, wherein the frame consists essentially of a composite material.

3. The motor vehicle rear module of claim 1, wherein the frame includes a top portion and a bottom portion, and the extenders arc fastened beneath the bottom portion of the frame.

4. The motor vehicle rear module of claim 1, wherein the extenders are incorporated into the frame.

5. The motor vehicle rear module of claim 1, wherein the body includes fasteners for the rear doors of the vehicle.

6. The motor vehicle rear module of claim 1, wherein the means for fastening to frame to the body engages the fasteners for to rear doors to the body.

7. A motor vehicle comprising a body and a rear module for extending the body of the vehicle, the rear module being supported only by the body, and for supporting rear doors and a rear bumper, the rear module including a frame comprising:
   a) a plastic material;
   b) means for fastening to the body;
   c) fasteners for the rear doors; and
   d) extenders for extending side rails of the vehicle.

8. A motor vehicle comprising a body including fastener means for rear doors, and a rear module for extending the body of the vehicle, the rear module being supported only by the body, mid for supporting the rear doors and a rear bumper, the rear module including a frame comprising:
   a) a plastic material;
   b) means for fastening to the body;
   c) fasteners for the rear doors; and
   d) extenders for extending side rails of the vehicle.

9. A motor vehicle rear module for extending a body a vehicle by fastening thereto, and for supporting rear doors and a rear bumper, the motor vehicle rear module including a frame comprising:
   a) a plastic material;
   b) means for fastening to the body;
   c) fasteners for the rear doom; and
   d) extenders for extending side rails of the vehicle, wherein the means for fastening to the body engages the fasteners for the rear doors.

* * * * *

UNITED STATES PATENT AND TRADEMARK OFFICE
CERTIFICATE OF CORRECTION

| | | |
|---|---|---|
| PATENT NO. | : 7,216,911 B2 | Page 1 of 1 |
| APPLICATION NO. | : 11/049364 | |
| DATED | : May 15, 2007 | |
| INVENTOR(S) | : Gerald Andre and Dominique Delavalle | |

It is certified that error appears in the above-identified patent and that said Letters Patent is hereby corrected as shown below:

In col. 3, line 4 of claim 8, delete "mid" and insert therefor --and--.
In col. 4, line 6 of claim 9, delete "doom" and insert therefor --doors--.

Signed and Sealed this

Twenty-fifth Day of December, 2007

JON W. DUDAS
*Director of the United States Patent and Trademark Office*